Patented Oct. 17, 1933

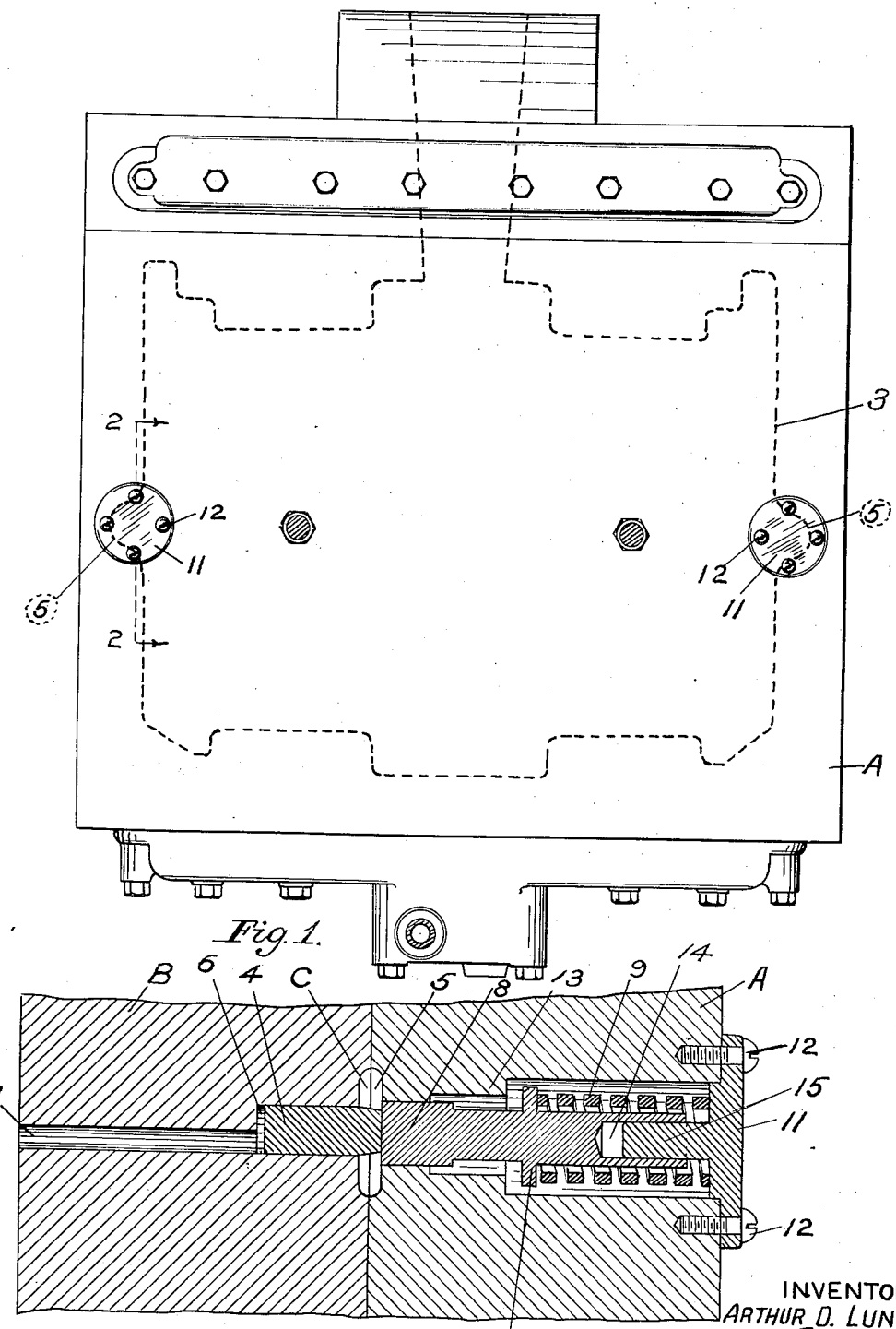

1,930,815

UNITED STATES PATENT OFFICE 1,930,815

MOLD MECHANISM FOR CASTING MACHINES

Arthur D. Lund, Minneapolis, Minn.

Original application February 17, 1930, Serial No. 428,886. Divided and this application October 16, 1931. Serial No. 569,134

7 Claims. (Cl. 22—94)

This invention relates to casting machinery and the primary object is to provide means of a novel, efficient, and practical nature for effecting a proper discharge of the completed castings from the molds, and also for providing the molds with means for properly and accurately aperturing the castings so that they can be centered in a punch press or cutting machine prior to the trimming operation.

This application is a division of my copending application Serial No. 428,886, filed February 17th, 1930, for Molding device for casting machines, and the invention is embodied in a mold structure that is particularly adapted for use in a grid casting machine of the type illustrated in my Patent No. 1,811,143 issued June 23rd, 1931.

In the drawing, which illustrates a preferred embodiment of the invention:

Fig. 1 is a rear or outside elevation of the mold structure embodying the invention, and, Fig. 2 is an enlarged detail sectional view on the line 2—2 in Fig. 1.

Referring to the drawing more particularly and by reference characters, A and B designate a pair of separable molds or mold blocks, having a cavity C, in which the grid plate, indicated by dotted lines 3 in Fig. 1, is to be formed. The molds A and B are of course mounted for relative reciprocating action so that the metal can be poured, formed, cooled, and discharged to form the grid plates in rapid succession; and, while either or both of the molds may be movable, I find it convenient to refer to the mold A as the stationary mold, and to the mold B as a movable mold. As explained in detail in my co-pending application, the mold cavity C is defined by complementing matrix faces of the molds, and each casting made comprises a plate from which several grid plates may be had by cutting and trimming the plate in a punching machine. In order that the plate may be properly centered in the punch, it is provided with centering apertures when being cast, and in order that the plate may properly leave one mold and follow with the other, during the opening movement, I provide means in conjunction with the aperturing device for controlling its movement until it is completely discharged from the mold. The mechanism in question may be described as follows:

The movable mold B is provided with two (or more) cores 4 which are preferably positioned adjacent to lug forming pockets 5 projecting laterally from the grid plate. Each of these cores 4 has a tight driving fit in the hole 6 drilled for it, and is subject to slight longitudinal adjustment therein when tapped in either direction. As shown in Fig. 2, a hole 7 is drilled in from the back of the mold block so that a pin (not shown) may be inserted and tapped when it is found necessary to slightly advance the core. In the event that the core should project too far into the mold cavity, or toward the mold A, it may be moved back by tapping against its exposed end. This exposed end of the core, as shown, is slightly tapered so that it may be more readily released from the grid plate at the proper time.

In axial alignment with the core 4 is a pin 8, slidable in the mold A, and having its inner end face spring pressed against the end of the core 4 under the action of a spring 9 which is compressed between a flange 10 of the pin 8 and a cap 11 secured as by screws 12 against the back of the mold A to close the opening made for the pin and spring. The flange 10 also serves to limit the forward action of the pin 8 by stopping against the shoulder 13 shortly after the two molds start to separate. During this limited movement, however, the pin 8, having a larger end surface area than the core 4, will press against the formed casting lug in the pocket 5 and will thus urge the opposite sides of the grid plate away from the mold A so that it will move in conjunction with the mold B. It will be noted that the end of the pin 8 within the spring 9 has an axial end aperture 14 which slidably guides upon an integral pin projection 15 of the cap 11.

As the molds approach their completely open positions the grid plate is removed from the mold B by suitable means such as kick-out devices as shown in Figs. 2, 4, and 8 of my application Serial No. 428,886; and when this is done it will be seen that the tapered portions of the cores 4 will leave the completed grid plate with two holes which may be conveniently used to properly center the grid plate upon the punching machine which is to cut and trim it.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination with a pair of separable molds having complementing matrix faces, of a core secured in one of the molds and having a tapered end projecting into the mold cavity, a movable pin in the other mold for contact with the end face of the core, and means for urging the movable pin into such end face contact with the core.

2. The combination with a pair of separable molds having complementing matrix faces, of a core secured in one of the molds with one end projecting into the mold cavity, and a spring pressed pin in the other mold for end contact with the core, said spring pressed pin having an end surface area projecting laterally with respect to the abutting end surface area of the core.

3. The combination with a pair of separable molds having a casting forming cavity, of means projecting from one of the molds into the cavity for engaging the casting to retain it therein as the molds are opened, and means carried by the other of said molds for dislodging the casting therefrom as the molds are being initially separated.

4. The combination with a pair of separable molds having a casting forming cavity, of means projecting from one of the molds into the cavity for engaging the casting to retain it therein as the molds are opened, and means carried by the other of said molds for dislodging the casting therefrom as the molds are opened, said casting dislodging means comprising a movable member and spring means normally tending to urge the member into the said cavity, said retaining means being operative to engage said movable member and press it into the mold body as the molds are closed together.

5. The combination with a pair of separable molds having a casting forming cavity, of means projecting from one of the molds into the cavity for engaging the casting to retain it therein as the molds are opened, and means carried by the other of said molds for dislodging the casting therefrom as the molds are initially opened, said dislodging means being disposed so as to be acted upon by the casting retaining means and moved into a retracted position as the molds are closed.

6. The combination with a pair of molds having matrix faces defining a mold cavity for forming a casting, of a pin slidable in one of the molds with one end projectable into the cavity, a spring acting upon the pin to move it toward the other mold as the molds are initially opened so as to retain the casting in place in said other mold during such initial opening, and a core projecting from the other mold and operative by a closing action of the molds for restoring the pin to its initial position with its end face substantially flush with the matrix face of the mold in which it is mounted.

7. A casting dislodging device for one of a pair of separable molds, comprising a pin slidable in the mold and with one end substantially flush with the mold face forming the casting cavity, spring means constantly tending to move the pin into the cavity to dislodge the casting, and means extending from the other of said molds to engage the pin and hold it in its retracted position against such spring action when the molds are closed.

ARTHUR D. LUND.